3,755,575
PHARMACEUTICAL COMPOSITIONS
Leonard J. Lerner, New Brunswick, N.J., assignor to
E. R. Squibb & Sons, Inc., New York, N.Y.
No Drawing. Continuation-in-part of application Ser. No. 222,946, Sept. 11, 1962. This application Jan. 26, 1965, Ser. No. 428,189
Int. Cl. A61o 27/00
U.S. Cl. 424—240          2 Claims

ABSTRACT OF THE DISCLOSURE

A combination of a steroidal progestational agent and a steroidal estrogenic agent for parenteral administration to prevent conception.

---

This application is a continuation-in-part of application, Ser. No. 222,946, filed Sept. 11, 1962 now abandoned.

This invention relates to new compositions of matter. More particularly, this invention relates to physiologically active compositions having included therein, in combination, as active ingredients a steroidal progestational agent and a steroidal estrogenic agent. Even more particularly, this invention relates to parenterally administrable physiologically active compositions which when administered to female humans will effectively prevent conception over extended periods of time.

Heretofore, it has been necessary, when treating female humans by chemotherapeutic means for effectively preventing conception, to administer the chemical contraceptives in daily dosages over periods of time coinciding to the average menstrual cycle, i.e., twenty to twenty-eight days. Upon cessation of treatment with these contraceptive agents, vaginal bleeding commences simulating normal menses. Upon termination of a five-day period of vaginal bleeding, the usual daily dosage of the chemocontraceptive agent is again resumed for the next simulated twenty-day average menstrual cycle (non-bleeding phase). This method requires rigorous adherence to the scheduled administration of the contraceptive in order to obtain effective results, as any lapse or omission in the administration of the daily dosage of the chemo-contraceptive agent may result in the loss of contraceptive activity for the period involved.

It has now been found that contraceptive activity may be obtained for an entire average menstrual period, i.e., twenty to twenty-eight days, by the parenteral administration of a single dosage of the new compositions of this invention. Thus, complete protection may be obtained for an entire average menstrual period by a single injection of the new compositions of this invention, thereby obviating the necessity for a rigorous schedule of daily treatment and eliminating the possibility of loss of effectiveness through negligence or human error.

The new compositions of this invention have included as their active ingredients a combination of a protracted steroidal progestational agent and a protracted steroidal estrogenic agent. The progestational agent which may be employed in the practice of this invention is one which when administered in a single intramuscular injection to estrogen-primed immature ovariectomized rabbits will induce uterine secretory gland proliferation for a period of at least twenty days, and preferably from twenty to twenty-five days (said steroidal progestational agent hereinafter to be known as a "protracted steroidal progestational agent") and includes such compounds as inter alia, the acetophenone derivative of $16\alpha,17\alpha$-dihydroxyprogesterone, the acetylfuran derivative of $16\alpha,17\alpha$-dihydroxyprogesterone, 19-nor-$17\alpha$-hydroxyprogesterone caproate, $6\alpha$-methyl-$17\alpha$-hydroxyprogesterone acetate, the acetophenone derivative of 19-nor-$16\alpha,17\alpha$-dihydroxyprogesterone, the acetonide of 19-nor-$16\alpha,17\alpha$-dihydroxyprogesterone and the acetylfuran derivative of 19-nor-$16\alpha,17\alpha$-dihydroxyprogesterone and other like compounds. It has been found that the most preferable protracted steroidal progestational agent is the acetophenone derivative of $16\alpha,17\alpha$-dihydroxyprogesterone, although the others give satisfactory results.

The protracted estrogenic agent which may be employed in the practice of this invention include those estrogens which when administered in a single subcutaneous injection to ovariectomized mature female rats will include cornified vaginal smears for at least ten days, and preferably ten to fifteen days, (said steroidal estrogenic agent hereinafter to be known as a "protected steroidal estrogenic agent"), and include such compounds as estradiol valerate, estradiol enanthate, estradiol undecylate, estradiol palmitate, estradiol butyrate, estradiol caprylate, estradiol cyclopentyl propionate and other like compounds. It has been found that the most preferable protracted steroidal estrogenic agent employable is estradiol enanthate, although the others also give satisfactory results. The relative amounts of the protracted steroidal progestational agent and the protracted steroidal estrogenic agent which may be employed in the practice of this invention that gives satisfactory results, has been found to vary. It has been found that satisfactory results may be obtained when from about ten to twenty parts by weight of the protracted steroidal progestational agent is combined with from about 0.5 to 3 parts by weight of the protracted steroidal estrogenic agent. In the most preferable embodiments of this invention ten to fifteen parts by weight of the protracted steroidal progestational agent is combined with from about one to three parts by weight of the protracted steroidal estrogenic agent in the finished product.

In order to obtain the satisfactory results of this invention, the novel compositions of this invention must be parenterally administered to the patient. The protracted steroidal progestational agents and the protracted steroidal estrogenic agents are combined in such a manner as to produce an easily injectible product. This may be accomplished in any manner known in the art; for example, a solvent such as benzyl alcohol or benzyl benzoate may be employed as a vehicle for thoroughly mixing the active ingredients of the composition. Additionally, a suitable pharmaceutical vehicle such as a liquid glyceridic oil, for example, edible vegetable oils, such as sesame oil, corn oil and the like, or an edible marine oil may be employed. Although the method of obtaining the finished compositions is not restricted, one procedure employable is to first dissolve the pharmaceutically active components in a solvent and then mix the resultant solution with a sufficient amount of suitable pharmaceutical vehicle to yield the final product. It has been found that satisfactory results may be obtained when from about ten to about twenty parts by weight of the protracted steroidal progestational agent and from about 0.5 to about 3 parts by weight of the protracted steroidal estrogenic agent is combined with from about ten to about twenty parts by weight of a suitable pharmaceutical vehicle. This final product may then be filled into suitable containers and stored for future use.

The following tests set forth the method of determining the pharmaceutically active components which may be employed in the practice of this invention:

TEST 1

Determination of the protracted steroidal progestational agent

Immature female rabbits weighing seven hundred to twelve hundred grams each are ovariectomized. After a four to six-day post-surgery rest period the animals are estrogen-primed with a total of fifteen micrograms of estradiol benzoate administered subcutaneously in three divided doses over a six-day period. On the last day of priming a single ten milligram dose of the progesterone is administered intramuscularly. A maintenance dose of 0.5 microgram of estradiol benzoate is administered every other day through the study. Groups of animals are then sacrificed at five-day intervals beginning at five days post-injection and their uteri are weighed and histologically evaluated for endometrical proliferation by the method of McPhail (J. Physiol. 1934, vol. 83, 145). The protracted progestational agents employable in this invention are those which will induce uterine secretory gland proliferation for a period of at least twenty days.

TEST 2

Determination of the protracted steroidal estrogenic agent

Young adult castrated female rats are employed in this assay. All of the animals selected must respond to a standard dose of 0.6 microgram of estradiol benzoate with vaginal smears containing 100 percent cornified cells. The test compounds are administered in a single subcutaneous injection. Vaginal smears are taken twice daily for the first four days post-injection and daily thereafter for the duration of the assay. Duration of the full estrogenic effect is defined as the length of time the vaginal smears contain 100 percent cornified cells, this being at least ten days.

The following examples are illustrative of the invention:

EXAMPLE 1

| | Mg. |
|---|---|
| Acetophenone derivative of 16α,17α-dihydroxyprogesterone | 100.0 |
| Estradiol enanthate | 10.0 |
| Benzyl alcohol | 20.0 |
| Benzyl abenzoate | 300.0 |
| Sesame oil, q.s. 1 ml. | |

The protracted steroidal progestogen and the protracted steroidal estrogen are dissolved in the sesame oil containing benzyl alcohol and benzyl benzoate warming if necessary. The solution is sterilized by blanketing with nitrogen gas and autoclaving at 121° C. for two hours. It is then filled into sterile glass vials.

EXAMPLE 2

| | Mg. |
|---|---|
| Acetophenone derivative of 16α,17α-dihydroxyprogesterone | 100 |
| Estradiol enanthate | 50 |
| Benzyl alcohol | 20 |
| Benzyl benzoate | 400 |
| Castor oil, q.s. 1 ml. | |

The benzyl alcohol, benzyl benzoate and castor oil are mixed, and warmed and the protracted steroidal progestogen and the protracted steroidal estrogen are dissolved in the oil vehicle by stirring. The solution is then filled into vials and the vials sealed with rubber stoppers and aluminum seals. The filled vials are then autoclaved at 121° C. for two hours to render them sterile.

Employing the acetophenone derivative of 16α,17α-dihydroxyprogesterone as the protracted steroidal progestogen in the procedure set forth in Test 1 yields uterine secretory gland proliferation for a period of twenty days.

Employing estradiol enanthate as the protracted steroidal estrogen according to the procedure set forth in Test 2, cornified vaginal smears are obtained in the test animals for more than ten days.

Similarly, following the procedure set forth in Example 2, but substituting equivalent amounts of the acetylfuran derivative of 16α,17α-dihydroxyprogesterone, 19-nor-17α-hydroxyprogesterone caproate, 6α-methyl-17α-hydroxyprogesterone acetate, and the acetophenone derivative of 19-nor-16α,17α-dihydroxyprogesterone for the acetophenone derivative of 16α,17α-dihydroxyprogesterone and substituting equivalent amounts of estradiol undecylate, estradiol valerate, or estradiol caprylate for estradiol enanthate, like results are obtained.

EXAMPLE 3

Conception controlled studies on human females employing a single, once-a-month injection are carried out employing the compounds and the amounts thereof set forth in Table 1. The compositions of this invention were parenterally administered to the patient on the eighth day after the onset of her previous menstruation. The patients were observed for duration of menstrual cycle, ovulation and side effects encountered upon the employment of the instant invention, the results of which are tabulated in Table 2.

TABLE 1

| Composition | A | B | C | D |
|---|---|---|---|---|
| Acetophenone derivative of 16α,17α-dihydroxyprogesterone, mg | 150 | 100 | 200 | 150 |
| Estradiol enanthate, mg | 10 | 20 | 20 | 15 |

TABLE 2

| Composition | Total cycles | Average duration of cycle, days | Divergent* cycles/ total cycles | Total cycles | Ovulation | Breast | Amenorrhea | Dysmenorrhea | Nausea | Edema | Others |
|---|---|---|---|---|---|---|---|---|---|---|---|
| A | 77 | 27.5 | 1/77 (1.3%) | 77 | 0 | 7 | 0 | 4 | 3 | 0 | ¹3 |
| B | 227 | 25.7 | 9/227 (4.0%) | 227 | 0 | 19 | 0 | 11 | 4 | 0 | ²5 |
| C | 18 | 26.8 | 1/18 (5.6%) | 18 | 0 | 0 | 0 | 0 | 0 | 0 | 0 |
| D | 69 | 26.5 | 6/69 (8.7%) | 69 | 0 | 1 | 0 | 1 | 1 | 0 | 0 |

¹ Vertigo.
² 2 cases of weight gain; 2 cases of headache; 1 case of sore throat.
*Divergent cycle considered to be shorter than twenty days or longer than thirty-two days.

The above tests show that the compositions of the instant invention prevent conception for an average menstrual cycle upon the administration of only one injection and without substantial untoward side effects.

The invention may be variously otherwise embodied within the scope of the appended claims.

What is claimed is:

1. A composition for the prevention of conception in human females for a period of from twenty to twenty-eight days by single administration comprising a parenterally administrable composition of about ten to twenty parts by weight of protracted progestational agent which is an acetophenone derivative of 16α,17α-dihydroxyprogesterone and from 0.5 to 3 parts by weight of a protracted estrogenic agent which is estradiol enanthate and a pharmaceutically acceptable non-toxic parenterally administrable vehicle.

2. A composition as in claim 1 containing about 150 mg. of the acetophenone derivative of 16α,17α-dihydroxyprogesterone and about 10 mg. of estradiol enanthate.

References Cited

UNITED STATES PATENTS 3,051,624   8/1962   Lozinski _____ 167—74

OTHER REFERENCES

Henshaw, P. S. "Physiologic Control of Fertility," Science (May 29, 1953), 117:3048, pp. 572–582.

Lerner, L. J. Biological Activities of 16α,17α-dihydroxyprogesterone Derivatives, Soc. Expl. Biol. Med., vol. 106, pp. 231–234, Feb. 20, 1961.

STANLEY J. FRIEDMAN, Primary Examiner

UNITED STATES PATENT OFFICE
CERTIFICATE OF CORRECTION

K336a

Patent No. 3,755,575   Dated August 28, 1973

Inventor(s) Leonard J. Lerner

It is certified that error appears in the above-identified patent and that said Letters Patent are hereby corrected as shown below:

Column 1, line 19, there should be a comma (,) between "1962" and "now".

Column 2, line 21, "protected" should read --protracted--.

Column 3, line 55, "abenzoate" should read --benzoate--.

Table 2, the last eight columns should be headed --Side Effects--.

Signed and sealed this 1st day of January 1974.

(SEAL)
Attest:

EDWARD M. FLETCHER, JR.   RENE D. TEGTMEYER
Attesting Officer         Acting Commissioner of Patents